(12) United States Patent
Maurer et al.

(10) Patent No.: US 11,920,489 B2
(45) Date of Patent: Mar. 5, 2024

(54) EXHAUST TURBOCHARGER HAVING A BEARING ASSEMBLY MODULE

(71) Applicant: Turbo Systems Switzerland Ltd, Baden (CH)

(72) Inventors: Florian Maurer, Zürich (CH); Christian Kreienkamp, Bad Sackingen (DE); Bruno Ammann, Aarau (CH)

(73) Assignee: Turbo Systems Switzerland Ltd, Baden (CH)

( * ) Notice: Subject to any disclaimer, the term of this patent is extended or adjusted under 35 U.S.C. 154(b) by 0 days.

(21) Appl. No.: 17/276,927

(22) PCT Filed: Sep. 24, 2019

(86) PCT No.: PCT/EP2019/075737
§ 371 (c)(1),
(2) Date: Mar. 17, 2021

(87) PCT Pub. No.: WO2020/064750
PCT Pub. Date: Apr. 2, 2020

(65) Prior Publication Data
US 2022/0034238 A1     Feb. 3, 2022

(30) Foreign Application Priority Data

Sep. 24, 2018 (EP) .................................... 18196264

(51) Int. Cl.
*F01D 25/16*   (2006.01)
*F01D 5/00*    (2006.01)
(Continued)

(52) U.S. Cl.
CPC .......... *F01D 25/166* (2013.01); *F01D 5/005* (2013.01); *F01D 25/18* (2013.01); *F16C 17/26* (2013.01);
(Continued)

(58) Field of Classification Search
CPC ...... F16C 33/6659; F16C 35/02; F16C 35/04; F16C 35/042; F16C 35/045; F16C 35/067;
(Continued)

(56) References Cited

U.S. PATENT DOCUMENTS 5,246,352 A * 9/1993 Kawakami ............ F01D 25/166
                                                       417/407
5,253,985 A * 10/1993 Ruetz ...................... F01D 25/18
                                                       384/473
(Continued)

FOREIGN PATENT DOCUMENTS

CN     101568736 A     10/2009
CN     103016545 A     4/2013
(Continued)

OTHER PUBLICATIONS

European Patent Office, International Search Report for PCT/EP2019/075737, dated Nov. 18, 2019, 7 pages (with translation).
(Continued)

*Primary Examiner* — James Pilkington
(74) *Attorney, Agent, or Firm* — Armstrong Teasdale LLP

(57) ABSTRACT

An exhaust turbocharger including a modular bearing designed for bearing a shaft and arranged between a compressor and a turbine is provided herein. The bearing has a bearing housing having a receptacle chamber, wherein a bearing assembly module can be or is installed in the receptacle chamber and can be non-destructively removed. The receptacle chamber is sized such that either a bearing assembly module having a rolling bearing or a bearing assembly module having a slide bearing can be installed. The receptacle chamber has an interface, designed to contact the bearing flange of a bearing assembly module inserted into the receptacle chamber. The interface is designed to connect an oil gallery passing through the bearing housing
(Continued)

to one or more oil galleries passing through a bearing flange of the bearing assembly module.

17 Claims, 7 Drawing Sheets

(51) Int. Cl.
| | |
|---|---|
| *F01D 25/18* | (2006.01) |
| *F16C 17/26* | (2006.01) |
| *F16C 19/18* | (2006.01) |
| *F16C 19/54* | (2006.01) |
| *F16C 33/60* | (2006.01) |
| *F16C 33/66* | (2006.01) |
| *F16C 35/02* | (2006.01) |
| *F16C 35/04* | (2006.01) |
| *F16C 35/077* | (2006.01) |

(52) U.S. Cl.
CPC .......... *F16C 19/184* (2013.01); *F16C 19/548* (2013.01); *F16C 33/60* (2013.01); *F16C 33/6659* (2013.01); *F16C 35/02* (2013.01); *F16C 35/045* (2013.01); *F16C 35/077* (2013.01); *F05D 2220/40* (2013.01); *F05D 2230/80* (2013.01); *F05D 2260/98* (2013.01); *F16C 2360/24* (2013.01)

(58) Field of Classification Search
CPC .... F16C 35/077; F16C 2360/24; F01D 25/16; F01D 25/162; F01D 25/166; F01D 25/18; F05D 2240/40; F05D 2240/50
See application file for complete search history.

(56) References Cited

U.S. PATENT DOCUMENTS

| | | |
|---|---|---|
| 8,740,465 B2 | 6/2014 | McKeiran, Jr. |
| 9,261,105 B2 * | 2/2016 | Schmidt ................ F16C 35/067 |
| 9,879,689 B2 | 1/2018 | Kocher et al. |
| 10,208,623 B2 * | 2/2019 | Hettinger ................ F01D 25/16 |
| 2002/0155009 A1 | 10/2002 | Panos et al. |
| 2005/0047690 A1* | 3/2005 | Keramati ................ F16C 17/04 384/368 |
| 2012/0219245 A1 | 8/2012 | McKeiran, Jr. |
| 2013/0071243 A1 | 3/2013 | Kocher et al. |
| 2014/0193239 A1 | 7/2014 | Ramasamy et al. |
| 2015/0192176 A1 | 7/2015 | Schmidt |
| 2015/0233382 A1 | 8/2015 | Nguyen-Schaefer |
| 2015/0337847 A1 | 11/2015 | Koch et al. |

FOREIGN PATENT DOCUMENTS

| | | | |
|---|---|---|---|
| CN | 103206271 A | | 7/2013 |
| CN | 104364494 A | | 2/2015 |
| DE | 4021325 C1 | | 1/1992 |
| DE | 102012211891 A1 | | 1/2014 |
| DE | 112013002332 T5 | | 1/2015 |
| DE | 102014201081 | * | 7/2015 |
| EP | 1253307 A2 | | 10/2002 |
| GB | 2248278 A | | 4/1992 |
| JP | S60043137 U | | 3/1985 |
| JP | S61047434 U | | 3/1986 |
| JP | S63009428 U | | 1/1988 |
| JP | H04017729 A | | 1/1992 |
| JP | 2011153569 A | | 8/2011 |
| JP | 2014126082 A | | 7/2014 |

OTHER PUBLICATIONS

European Patent Office, Written Opinion for PCT/EP2019/075737, dated Nov. 18, 2019, 13 pages (with partial machine translation).
European Patent Office, Extended European Search Report for EP 18196264.8, dated Mar. 22, 2019, 15 pages (with partial machine translation).
English Translation of Search Report issued in Japanese Patent Application No. 2021-516665, dated May 10, 2023, 12 pages.
Office Action issued in Japanese Patent Application No. 2021-516665, dated May 16, 2023, with English translation, 6 pages.

* cited by examiner

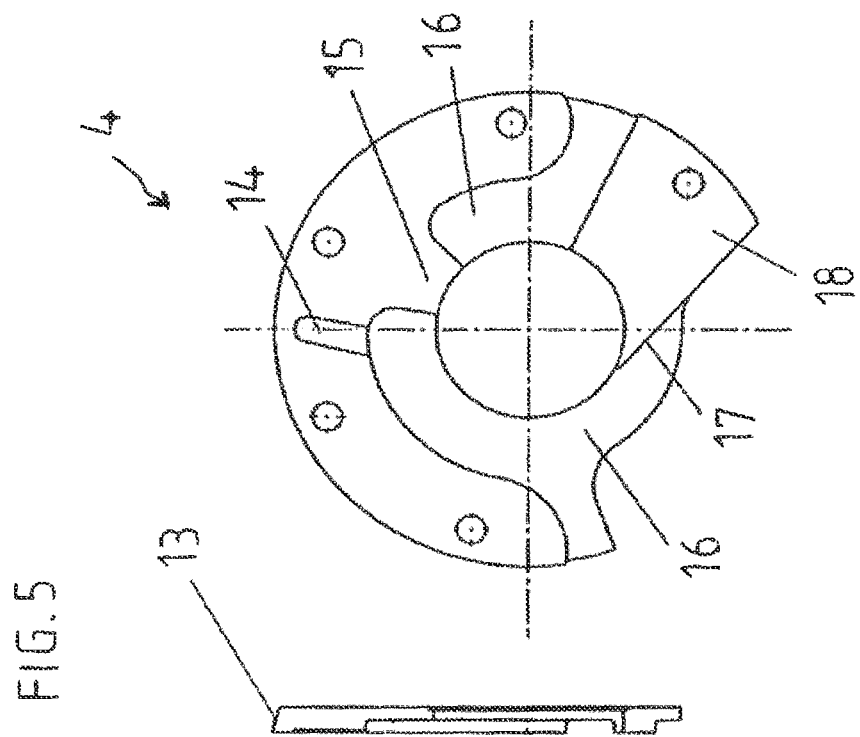
FIG. 5
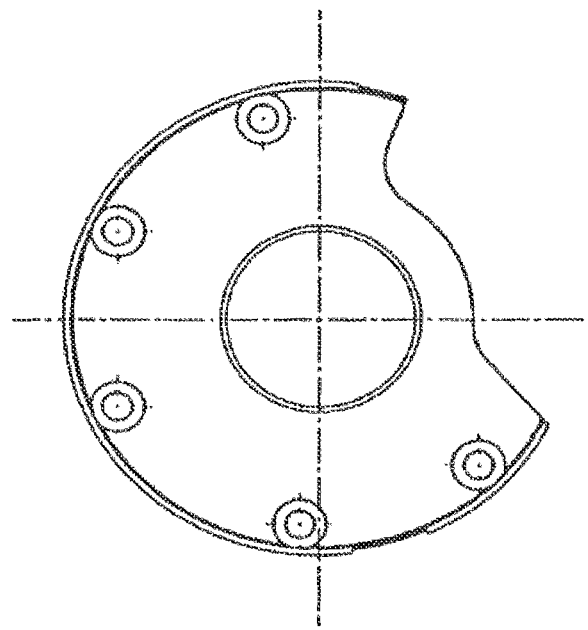

EXHAUST TURBOCHARGER HAVING A BEARING ASSEMBLY MODULE

CROSS-REFERENCE TO RELATED APPLICATIONS

This application is a national stage entry under 35 U.S.C. § 371 of PCT International Application No. PCT/EP2019/075737, filed Sep. 24, 2019, which claims priority to European Patent Application No. 18196264.8, filed Sep. 24, 2018. The entire disclosures of the foregoing applications are incorporated herein by reference.

TECHNICAL FIELD OF THE INVENTION

The invention relates to an exhaust turbocharger which has a bearing which is arranged between a compressor and a turbine and in which the shaft of the exhaust turbocharger is mounted.

BACKGROUND

Plain bearings are the bearings most frequently used in industry because of their robustness and their simple construction. However, rolling bearings provide advantages in many respects. In the same application, the bearing friction and thus the power loss is only a fraction of those of plain bearings. The transient behavior of turbo engines can be significantly improved (load absorption) by means of the low bearing friction. Similarly, the oil consumption for lubrication and cooling when using rolling bearings can be reduced to a fraction of the quantity required for plain bearings.

Nevertheless, in particular exhaust turbochargers are customarily provided with hydrodynamic plain bearings which are divided into two types depending on the load absorption direction.

A first type of such a plain bearing is a radial bearing. Radial bearings, generally two per shaft, absorb the radial forces of the rotating rotor, consisting of the main components turbine wheel, shaft and compressor wheel, and stabilize said rotor. Two oil-filled annular gaps of different dimensions per radial bearing split the functions here of stabilization and damping. Depending on the design, one radial bearing, driven by the movement of the shaft, can itself rotate or can be fixed in terms of rotation. Forces which are absorbed by the radial bearing include weight forces and unbalanced forces.

A second type of such a plain bearing is an axial bearing. An axial bearing absorbs shearing stress which acts on the rotor. A global thrust acting on the rotor arises due to different pressures which act on various surfaces primarily of compressor and turbine. The force absorption capability of a hydrodynamic axial bearing arises by means of lubricating oil which is pressed into narrowing, wedge-shaped regions by the rotation of the shaft, which has the result of building up pressure constituting the counter force to the thrust.

Hitherto, because of diverse technical challenges, turbochargers having a rotor mounted by rollers could be mass produced only in a few cases. Examples thereof are found in the automobile industry, wherein the converted operating period of approx. 2900 h (200 000 km at an average speed of 70 km/h) used there for design purposes is significantly below that of other industry sectors such as, for example, mining, the metal industry, the machinery industry or energy industry. If operating times longer than those of road traffic vehicles of normal design are required, engines have to be subjected to regular service work, such as, for example, to inspection, to cleaning and to exchange of replacement parts. For this purpose, the respective exhaust turbocharger is disassembled and reassembled again after the service work has been carried out. In contrast thereto, exhaust turbochargers used in the automobile industry are operated until damage occurs and are then completely replaced. Accordingly, disassembly and renewal of wearing parts are not provided.

Turbochargers in the automobile sector, because of the significant price pressure, are constructed from as few parts as possible, which saves procurement costs and lead time during the installation. Modular systems are scarcely used since every component is designed as cost-effectively as possible for a specific use and is manufactured in high piece numbers. By contrast, a high degree of flexibility is required in other industry branches. For turbochargers, for example, in the energy industry, thermodynamic matching material on the compressor side and turbine side for rotors and stators, different air inlet housings and outlet housings, diverse possibilities for water connections and oil connections, etc., are required.

However, the flexibility of changing types of bearings in the same turbocharger has hitherto not been provided. The design of previously known rolling- and sliding-mounted turbochargers differ significantly.

OBJECT OF THE INVENTION

It is the object of the invention to specify a simply constructed and robust exhaust turbocharger, the flexibility of which is increased.

BRIEF SUMMARY OF THE INVENTION

This object is achieved by an exhaust turbocharger which contains a modular bearing which is arranged between a compressor and a turbine and is designed for bearing a shaft, wherein the bearing has a bearing housing with a receiving chamber, wherein a bearing assembly module can be installed or is installed in the receiving chamber and can be removed without being destroyed, wherein the receiving chamber is dimensioned in such a manner that either a bearing assembly module having rolling bearings or a bearing assembly module having plain bearings can be installed, wherein the receiving chamber has an interface which is designed for making contact with the bearing flange of a bearing assembly module installed in the receiving chamber, and wherein the interface is designed for connecting an oil duct guided through the bearing housing to one or more oil ducts guided through a bearing flange of the bearing assembly module.

The advantages of the invention consist in particular in that an exhaust turbocharger having the features specified in the disclosure can be used flexibly. If, for example, a bearing assembly module having plain bearings is inserted into the receiving chamber of the bearing housing, said bearing assembly module can then be removed from the receiving chamber without being destroyed and can be replaced, for example, by a bearing assembly module having rolling bearings. Furthermore, there is the possibility of removing a bearing assembly module, which is inserted into the receiving chamber of the bearing housing of the exhaust turbocharger and has rolling bearings, from the receiving chamber without being destroyed, of being subjected to a maintenance operation and then being reinstalled in the receiving chamber.

According to one embodiment of the invention, the design and the external dimensions of a bearing assembly module which can be inserted or is inserted into the receiving chamber and has rolling bearings correspond to the design and the external dimensions of the bearing assembly module which is inserted or can be inserted into the receiving chamber and has plain bearings to such an extent that the bearing assembly module having rolling bearings and the bearing assembly module having plain bearings can be inserted interchangeably into the receiving chamber.

According to one embodiment of the invention, the bearing assembly module has a rolling bearing cartridge, a bearing flange, a closure cover, an oil baffle and a rotation prevention means, wherein the rolling bearing cartridge has a rolling bearing which includes an outer race, an inner race and rolling bodies arranged between the outer race and the inner race.

According to one embodiment of the invention, the inner race has two inner race parts, and the turbine-side outer edge of the inner race part arranged on the turbine side is extended outward in the axial direction relative to the turbine-side outer edge of the outer race.

According to one embodiment of the invention, the oil baffle serves during the disassembly of the turbocharger as an axial counter bearing for the inner race, and an axial gap between the inner race and the oil baffle is smaller than the axial movability of the turbine-side rolling bodies in the running grooves of the rolling bearing at zero load of the bearing.

According to one embodiment of the invention, the oil baffle has two ribs, and the tangential edge of one of said ribs serves as an oil windage tray for introduced cooling oil during the operation of the bearing assembly module.

According to one embodiment of the invention, the diameter of the oil baffle is enlarged at the radially outer edge thereof in relation to the counter surface of the bearing flange in order to form a drainage channel.

According to one embodiment of the invention, the oil baffle is fastened to the bearing flange by means of fastening elements and can be centered on the bearing flange by means of said fastening element.

According to one embodiment of the invention, the exhaust turbocharger has an annular groove which is designed for supplying oil to a squeeze oil damper of the rolling bearing and is arranged in the rolling bearing cartridge.

According to one embodiment of the invention, the closure cover serves as an axial stop for absorbing a shearing load acting in the axial direction in the direction of the compressor.

According to one embodiment of the invention, the closure cover is composed of nonferrous metal and/or has recesses.

According to one embodiment of the invention, the receiving chamber is designed in such a manner that the bearing assembly module can be installed and removed axially from the compressor side.

According to one embodiment of the invention, the receiving chamber has a step. The step preferably has a stop surface running substantially in the radial direction. The stop surface preferably faces the compressor, and therefore it defines an axial stop for a bearing assembly module inserted on the compressor side.

According to one embodiment of the invention, the step is arranged in the central part of the axial extent of the receiving chamber, for example at a distance from the compressor wheel that is 25% to 75% of the distance between the turbine wheel and the compressor wheel.

According to one embodiment of the invention, the step divides the receiving chamber preferably into a first receiving chamber section which is larger in the radial direction and a second receiving chamber section which is smaller in the radial direction, wherein the first and second receiving chamber sections are arranged axially adjacent to one another and the step is arranged between the first and second receiving chamber section. Preferably, the first receiving chamber section is arranged on the compressor side of the step and the second receiving chamber section is arranged on the turbine side of the step.

According to one embodiment of the invention, the step is therefore arranged between a compressor-side region of the receiving chamber and a turbine-side region of the receiving chamber.

According to one embodiment of the invention, the first receiving chamber section is dimensioned for receiving a thrust bearing (an axial bearing designed as a plain bearing) and the second receiving chamber section is dimensioned for receiving a rolling bearing.

According to one embodiment of the invention, the diameter of the compressor-side region of the receiving chamber in the radial direction is larger than the diameter of the turbine-side region of the receiving chamber in the radial direction.

According to one embodiment of the invention, the receiving chamber has a bearing housing bore extending in the axial direction for receiving a fastening means for fastening a bearing assembly module which is installed in the receiving chamber. The bearing housing bore is preferably a threaded bore, preferably a blind bore (opened toward the compressor), and is preferably provided in the step.

According to one embodiment of the invention, a bearing assembly module which is installed in the receiving chamber in the region of the step of the receiving chamber is fastened in the bearing housing by means of a fastening means engaging in the bearing housing (in particular engaging in the bearing housing bore).

According to one embodiment of the invention, the bearing assembly module has a larger diameter in the radial direction in the compressor-side region of the receiving chamber than in the turbine-side region of the receiving chamber.

According to one embodiment of the invention, the bearing assembly module in its compressor-side region has a bearing assembly module bore which extends in the axial direction and through which the fastening means engaging in the bearing housing is guided. The bearing assembly module bore is preferably a continuous bore.

According to one embodiment of the invention, the bearing housing has an oil supply for the bearing assembly module installed in the receiving chamber. The oil supply preferably opens from an axial direction into the receiving chamber, in particular form the turbine side. The oil supply preferably opens into the step. The oil supply is preferably charged with pressure and opens into the receiving chamber in a half chamber of the bearing housing positioned below the turbocharger axis.

According to one embodiment of the invention, there is a gap between the turbine-side end of the bearing assembly module and the turbine-side end of the bearing housing during the operation of the exhaust turbocharger.

According to one embodiment of the invention, a bearing assembly module is used for bearing the shaft of an exhaust turbocharger, wherein the exhaust turbocharger contains a modular bearing arranged between a compressor and a turbine of the exhaust turbocharger, wherein the bearing has a bearing housing with a receiving chamber, wherein the bearing assembly module is contained in a set of bearing assembly modules, wherein the set of bearing assembly modules comprises a bearing assembly module having rolling bearings and a bearing assembly module having plain bearings, wherein the bearing assembly module having rolling bearings and the bearing assembly module having plain bearings can be installed in the receiving chamber and can be removed from the receiving chamber without being destroyed, and wherein the bearing assembly module is used for bearing the shaft of the exhaust turbocharger by being installed in the receiving chamber so as to be removable without being destroyed.

According to one embodiment of the invention, in a method for bearing the shaft of an exhaust turbocharger, wherein the exhaust turbocharger contains a modular bearing arranged between a compressor and a turbine of the exhaust turbocharger, wherein the bearing has a bearing housing with a receiving chamber, the following steps are carried out:

selecting a bearing assembly module from a set of bearing assembly modules, which includes a bearing assembly module having rolling bearings and a bearing assembly module having plain bearings, wherein the bearing assembly module having rolling bearings and the bearing assembly module having plain bearings can be installed in the receiving chamber and can be removed from the receiving chamber without being destroyed, and installing the selected bearing assembly module in the receiving chamber.

According to one embodiment of the invention, the following further method step is carried out:

removing without destruction a bearing assembly module installed in the receiving chamber, wherein either a bearing assembly module having rolling bearings is removed from the receiving chamber without being destroyed and is replaced by another bearing assembly module likewise having rolling bearings or by a bearing assembly module having plain bearings, or a bearing assembly module having plain bearings is removed from the receiving chamber without being destroyed and is replaced by another bearing assembly module likewise having plain bearings or by a bearing assembly module having rolling bearings.

BRIEF DESCRIPTION OF THE DRAWINGS

The invention is described below with reference to exemplary embodiments which are explained in more detail with reference to drawings, in which FIG. 5 shows illustrations for illustrating an oil baffle.

DESCRIPTION OF EXEMPLARY EMBODIMENTS

According to the present invention, an exhaust turbocharger is provided which contains a modular bearing which is arranged between a compressor and a turbine and is designed for bearing a shaft, wherein the bearing has a bearing housing with a receiving chamber, wherein a bearing assembly module can be installed or is installed in the receiving chamber and can be removed without being destroyed, wherein the receiving chamber is dimensioned in such a manner that either a bearing assembly module having rolling bearings or a bearing assembly module having plain bearings can be installed, wherein the receiving chamber has an interface which is designed for making contact with the bearing flange of a bearing assembly module installed in the receiving chamber, and wherein the interface is designed for connecting an oil duct guided through the bearing housing to one or more oil ducts guided through a bearing flange of the bearing assembly module.

Furthermore, the present invention provides a bearing assembly module in which all of the components required for an operable rolling bearing of a bearing unit for an exhaust turbocharger are contained in an integral bearing assembly module which, when required, can be replaced by a new identically constructed bearing assembly module or else by a bearing assembly module variant having plain bearings.

Figure 1:
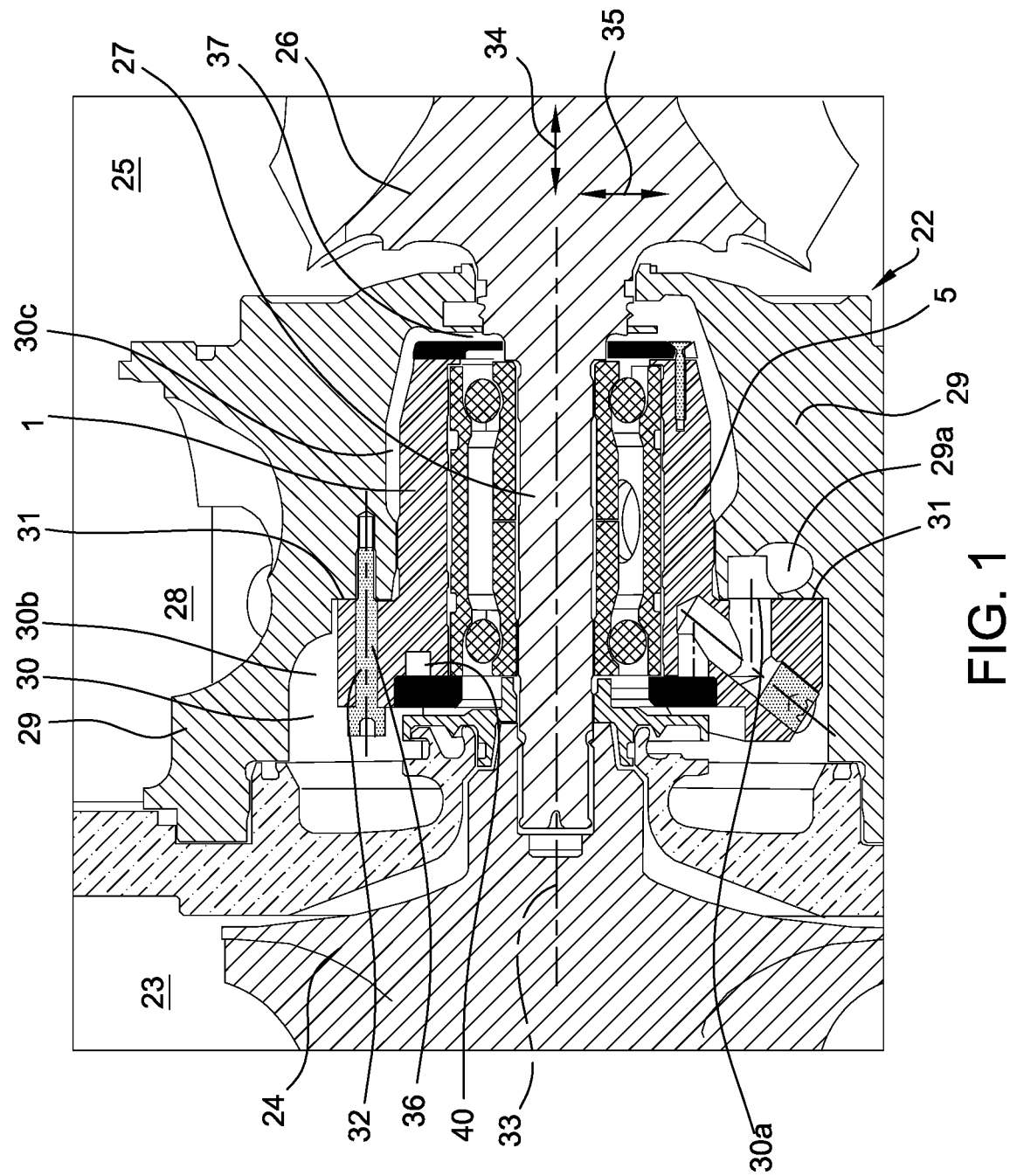
FIG. 1 shows a first sketch of an exhaust turbocharger with an installed bearing assembly module.

FIG. 1 shows a first sketch of an exhaust turbocharger with an installed bearing assembly module. Said exhaust turbocharger 22 has a compressor 23, a turbine 25 and a bearing 28 arranged between the compressor and the turbine. Of the compressor 23, FIG. 1 shows the compressor wheel 24 and, of the turbine 25, the turbine wheel 26. The compressor wheel 24 and the turbine wheel 26 are connected to a shaft 27 of the exhaust turbocharger 22 for conjoint rotation, said shaft being mounted in the bearing 28. The bearing 28 has a bearing housing 29. A receiving chamber 30 is provided in said bearing housing 29. A bearing assembly module 1 is inserted into said receiving chamber 30. Said bearing assembly module is a bearing assembly module having rolling bearings. Said rolling bearings are part of a rolling bearing cartridge, the construction of which is explained below with reference to further figures. The receiving chamber 30 is dimensioned in such a manner that either a bearing assembly module having rolling bearings or a bearing assembly module having plain bearings can be installed and, in the installed state, serves for bearing the shaft, which rotates at a high speed, of the exhaust turbocharger during the operation of the exhaust turbocharger.

The receiving chamber 30 and therefore also the bearing housing 29 have a step 31. Said step is provided in the central region of the axial extent of the receiving chamber 30. The axial direction 34 of the exhaust turbocharger coincides here with the longitudinal direction of the axis of rotation 33 of the exhaust turbocharger. The radial direction 35 of the exhaust turbocharger extends at a right angle to the axial direction 34. When the bearing assembly module is inserted axially from the compressor side of the exhaust turbocharger into the receiving chamber 30 of the bearing housing 29, the step of the bearing housing serves as a stop. The turbine-side end region of the bearing assembly module forms a sealing surface.

The step 31 is arranged between a compressor-side region 30b of the receiving chamber 30 and a turbine-side region 30c of the receiving chamber 30. The diameter of the compressor-side region 30b of the receiving chamber 30 is greater in the radial direction than the diameter of the turbine-side region 30c of the receiving chamber 30. This measure creates space in the compressor-side region 30b of the receiving chamber 30 for a thrust bearing which is required when a plain bearing is installed in the receiving chamber.

The bearing assembly module 1 installed in the receiving chamber 30 has a larger diameter in the radial direction 35 in the compressor-side region 30b of the receiving chamber 30 than in the turbine-side region 30c of the receiving chamber 30 and is fastened in the bearing housing 29 in the region of the step 31 by means of a fastening means 32 engaging in the bearing housing 29. For this purpose, the bearing assembly module in its compressor-side region has a bore 36 which extends in the axial direction 34 and through which the fastening means 32 engaging in the bearing housing 29 is guided. Said fastening means 32 is, for example, a screw.

There is a gap 37 between the turbine-side end of the bearing assembly module 1 and the turbine-side end of the bearing housing 29 during the operation of the exhaust turbocharger. Said gap makes it possible for cooling oil to be sprayed away from the shaft shoulder in the direction of the turbine-side region of the receiving chamber 30.

As described above, it is alternatively possible for a bearing assembly module having a rolling bearing or for a bearing assembly module having a plain bearing to be installed in the receiving chamber 30 of the bearing housing. The above-described special configuration of the receiving chamber 30, which has a larger diameter in the radial direction 35 in its compressor-side region 30b than in the turbine-side region 30c of the receiving chamber 30, can be attributed to the fact that a bearing assembly module having a plain bearing, in addition to radial bearings absorbing radial forces, requires a separate thrust bearing, for absorbing forces acting in the axial direction, said thrust bearing requiring a comparatively large amount of space in the radial direction. Both aforementioned bearing assembly modules are widened in the radial direction in their region arranged in the compressor-side region 30b of the receiving chamber 30 such that the respective bearing assembly module can be fastened in the bearing housing 29 in the region of the step 31 of the receiving chamber 30. For this purpose, a bore 36 is provided in the respective bearing assembly module, the bore extending in the axial direction 34 and through said bore fastening means 32 are guided which extend into the region of the bearing housing 29 and are provided for fastening the respective bearing assembly module in the receiving chamber 30.

Each of the bearing assembly modules mentioned can be removed without destruction from the receiving chamber 30 and therefore from the bearing housing 29 of the bearing 28 axially in the direction of the compressor 23 such that it can be maintained outside the exhaust turbocharger and can then be reinstalled in the receiving chamber 30 of the bearing housing 29 of the bearing 28 for further use. There is the possibility, for this maintenance, for the bearing assembly module to be dismantled into its individual parts and to maintain, repair or replace individual parts.

Alternatively to maintenance of the bearing assembly module removed from the receiving chamber, said bearing assembly module can also be replaced in the event of a non-repairable defect by a new bearing assembly module of the same type. For example, a defective bearing assembly module having rolling bearings can be replaced by a new bearing assembly module of the same type having rolling bearings.

Alternatively thereto, a defective bearing assembly module having plain bearings can be replaced by a new bearing assembly module of the same type and likewise having plain bearings.

A further alternative consists in removing a bearing assembly module installed in the receiving chamber 30 from the receiving chamber and in replacing it by a different type of bearing assembly module. For example, a bearing assembly module having rolling bearings can be replaced by a bearing assembly module having plain bearings. Alternatively thereto, a bearing assembly module having plain bearings can be replaced by a bearing assembly module having rolling bearings.

The receiving chamber 30 of the bearing housing 29 is provided with an interface 30a which is designed for making contact with the bearing flange 5 of the respective bearing assembly module. Said interface is advantageously designed for connecting an oil duct 29a guided through the bearing housing 29 to one or more oil ducts guided through the bearing flange 5 of the bearing assembly module. According to one exemplary embodiment, one of said oil ducts is connected to an annular duct 40 which is arranged on the compressor-side end side of the bearing assembly module. Oil is supplied from there to the radial bearing.

Figure 2:
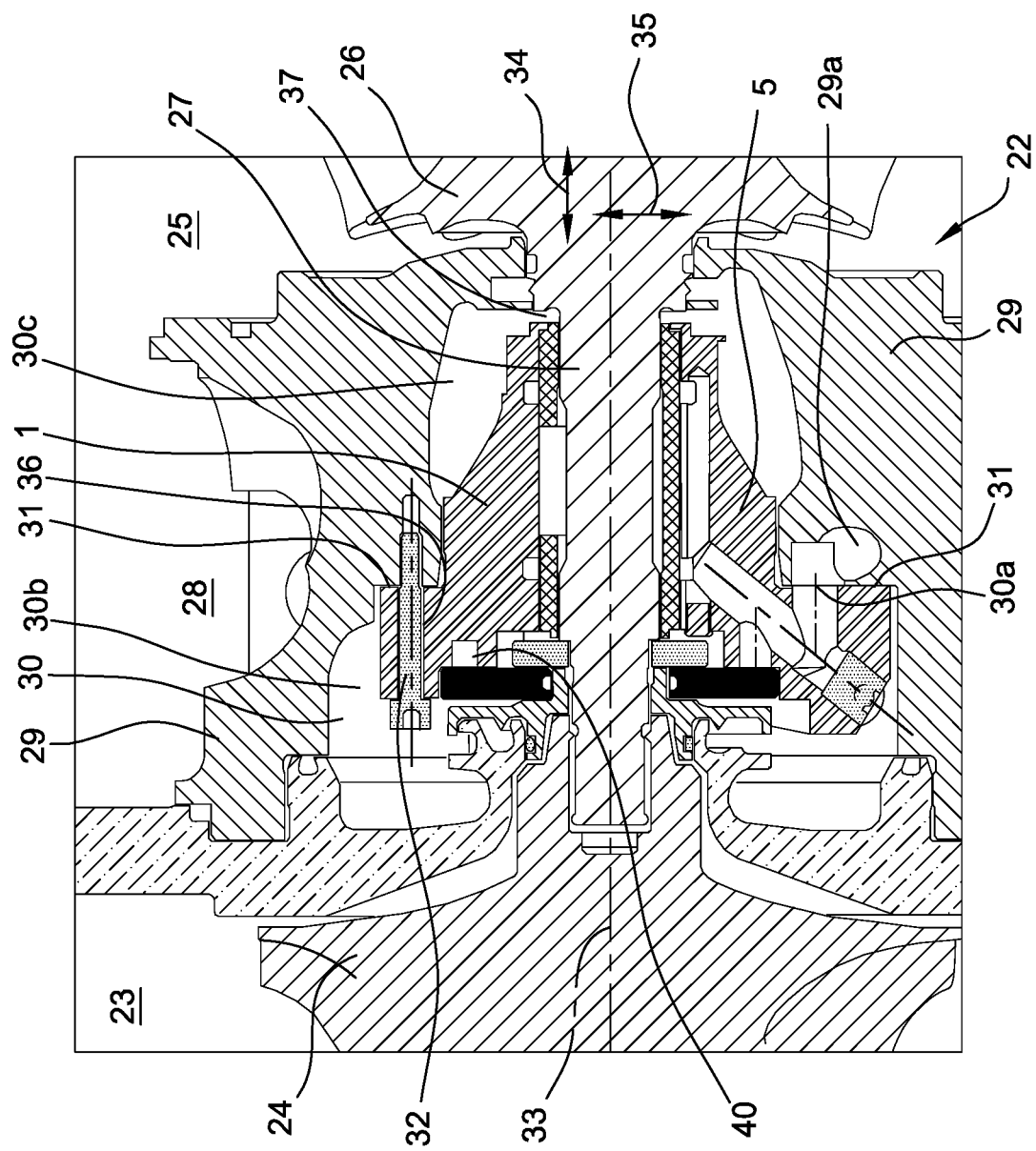
FIG. 2 shows a second sketch of an exhaust turbocharger with an installed bearing assembly module.

FIG. 2 shows a second sketch of an exhaust turbocharger with an installed bearing assembly module. The exhaust turbocharger illustrated in FIG. 2 is the same exhaust turbocharger as is illustrated in FIG. 1, with the exception that a bearing assembly module 1 having plain bearings is installed in the receiving chamber 30 of the bearing housing 29 of the bearing 28, wherein the interface 30a of the receiving chamber 30 is also designed here for making contact with the bearing flange 5 of the bearing assembly module, and wherein the interface 30a is also designed here for connecting an oil duct 29a guided through the bearing housing 29 to one or more oil ducts guided through the bearing flange 5 of the bearing assembly module, wherein oil is supplied to the plain bearing via one of said oil ducts guided through the bearing flange.

Figure 3:
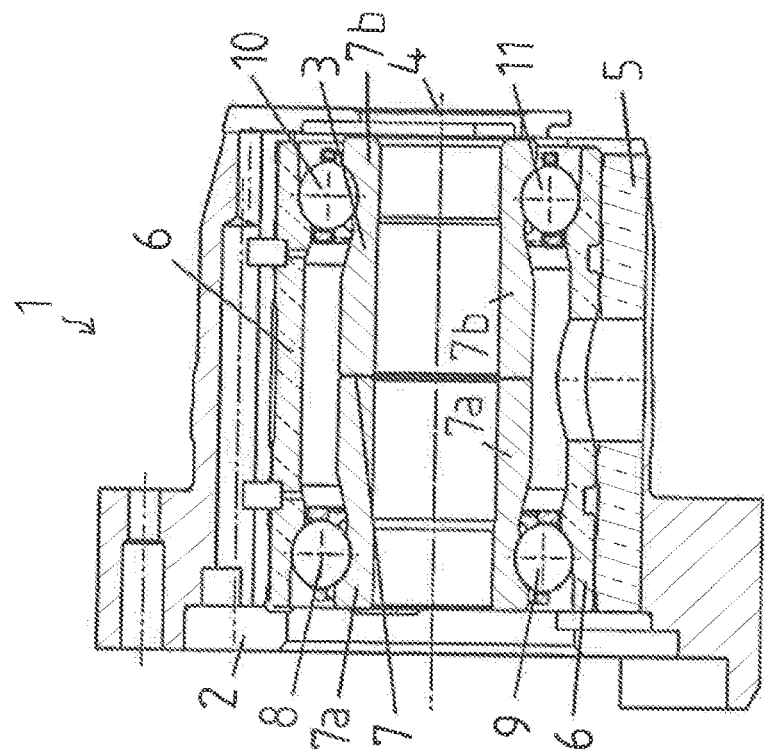
FIG. 3 shows illustrations for illustrating a bearing assembly module.
Figure 3:
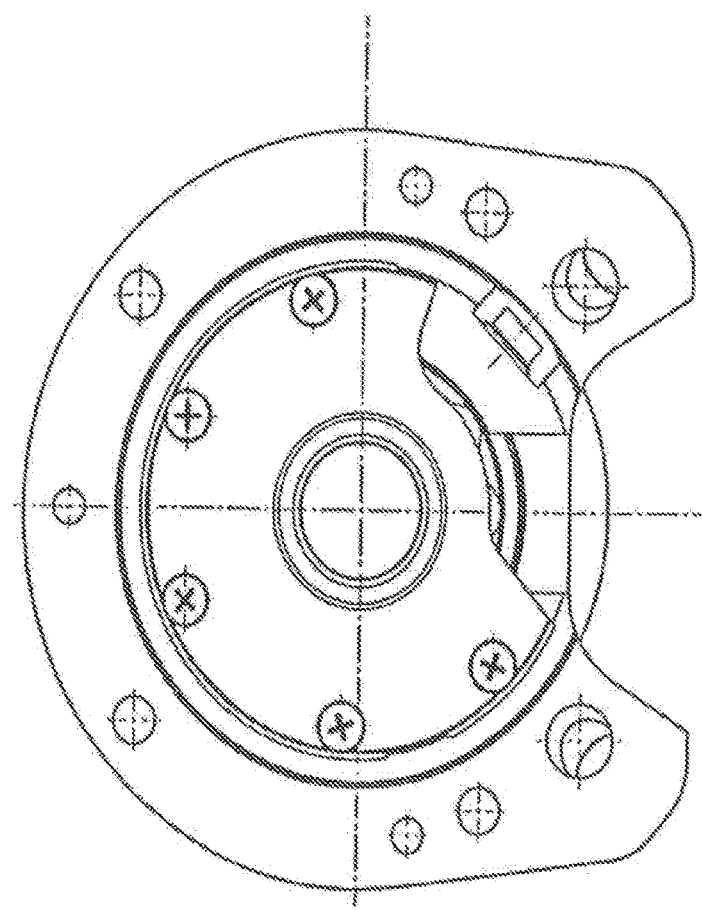

FIG. 3 shows a sectional illustration for illustrating an exemplary embodiment of a bearing assembly module 1 according to the invention. The latter contains a closure cover 2, a rolling bearing cartridge 3, an oil baffle 4, a bearing flange 5 and a rotation prevention means which is not visible in FIG. 3. These components are fixedly connected to one another using connecting elements, in particular screws, wherein the rolling bearing cartridge is movable in the chamber provided by bearing flange, closure cover and rotation prevention means. The components mentioned form an integral bearing assembly module which can be completely installed in the receiving chamber 30 of the bearing housing 29 of the exhaust turbocharger 22. Said exhaust turbocharger is provided, among other use possibilities, for supercharging an engine which is, for example, a ship's engine or an engine for generating power. An exhaust turbocharger of such an engine is distinguished in particular in that the diameter of the compressor wheel of the exhaust turbocharger is larger than 110 mm. In the case of exhaust turbochargers of those industry branches, there is the necessity of maintaining the exhaust turbocharger, for which, inter alia, the bearing has to be removed and, if required, also dismantled in order to be able to maintain individual components, repair them if required and also replace them if required.

The bearing assembly module shown in FIG. 3 is designed for an internal bearing of a shaft of the exhaust turbocharger between the compressor and the turbine of the exhaust turbocharger, as is already illustrated in FIG. 1.

The closure cover 2 is provided with features improving the rotor dynamics—as will also be explained below. The rolling bearing cartridge 3 has features for simplified disassembly—as will likewise also be explained below. The oil baffle 4 is designed in particular for active shaft cooling and furthermore assists disassembly of the bearing assembly module. The bearing flange 5 is preferably formed integrally and serves, inter alia, for supplying lubricating oil to the rolling bearing and for supply cooling oil to the bearing assembly module. The rotation prevention means fixes the positioning of an outer race of the rolling bearing.

The rolling bearing cartridge 3 shown in FIG. 3 contains a rolling bearing which has an outer race 6, a two-part inner race 7 with a first inner race part 7a and a second inner race part 7b and rolling bodies 8, 9, 10 and 11 which are arranged between the inner race 7 and the outer race 6 and which are preferably balls. Said balls are mounted in a cage which is illustrated in FIG. 4 at the reference sign 12.

The bearing assembly module 1 shown in FIG. 3 can be inserted into a receiving chamber, provided between the turbine and the compressor of the exhaust turbocharger, of the bearing housing of the bearing and can be screwed to the bearing housing, as is already illustrated in FIG. 1.

Figure 4:
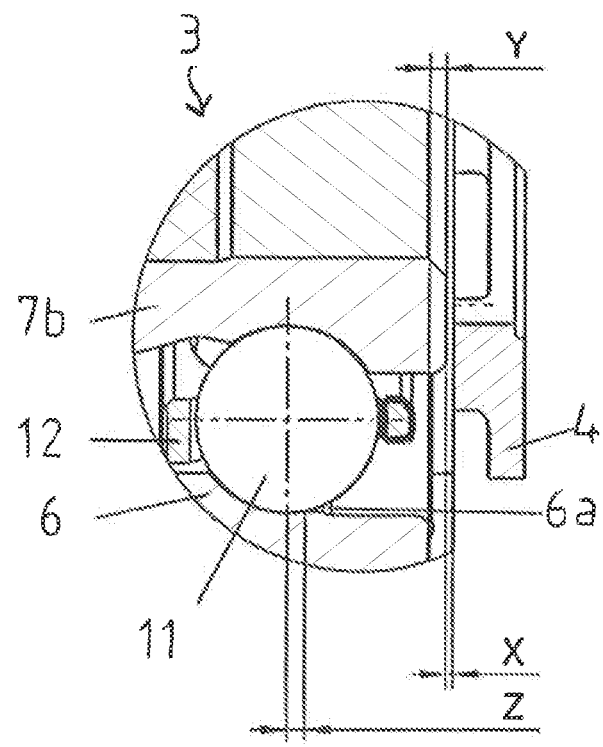
FIG. 4 shows a sectional illustration of part of the rolling bearing cartridge adjacent to the oil baffle.

FIG. 4 shows a sectional illustration of part of the rolling bearing cartridge 3 which is adjacent to the oil baffle 4. Of said rolling bearing cartridge 3, part of the outer race 6, part of the second inner race part 7b, the ball 11 and part of the cage 12 within which the ball 11 is arranged are illustrated in FIG. 4. As is apparent from FIG. 4, the outer race 6 has a rim 6a. Furthermore, it is apparent from FIG. 4 that the second inner race part 7b arranged on the turbine side is extended outward in the axial direction, i.e. in the direction of the turbine, relative to the turbine-side outer edge of the outer race 6. When a bearing assembly module is inserted in the bearing housing, said extension Y facilitates disassembly of the shaft of the exhaust turbocharger without damage to the rolling bearing cartridge 3 occurring. While the compressor-side rolling bearing inner race part 7a is supported by the compressor-side set of balls, the turbine-side rolling bearing inner race part 7b for the moment remains on the shaft and moves the turbine-side set of balls in the direction of the turbine once the rolling bearing cartridge 3 is present on the turbine side with the outer race 6 at the wall 19 (see FIG. 6). The axial gap X between the inner race 7 and the oil baffle 4 is smaller here than the axial movability Z of the turbine-side set of balls in the ball running surface of the unstressed rolling bearing cartridge. The inner race 7 is thus present fixedly at a wall while the set of balls remains unloaded and the shaft can be pressed out. Without such an axial stop, the inner race 7 would migrate further in the direction of the turbine and would press the turbine-side set of balls over the rim 6a shown in FIG. 4, would damage the balls and the running surfaces thereof and would dismantle the rolling bearing cartridge in an uncontrolled manner. During the operation of the exhaust turbocharger, the inner race 7, by contrast, cannot come into contact with the oil baffle 4.

During the operation of the exhaust turbocharger, oil is used for lubricating and cooling of the rolling bearing, for providing damping between the rolling bearing cartridge and the bearing flange and for cooling the shaft shoulder and the inner race on the turbine side. For the purposes of said oil supply, the bearing flange 5, which is formed as a single part, has oil supply ducts. For reasons of compactness, two annular grooves for supplying the squeeze oil damper of the rolling bearing with oil are not provided in the bearing flange 5, but rather in the rolling bearing cartridge. A cooling oil duct for the shaft shoulder is provided between the bearing flange 5 and the oil baffle 4.

FIG. 5 shows illustrations for illustrating the oil baffle 4. Said baffle 4 has a drainage channel 13, a cooling oil duct 14, a first rib 15, a seal wall 16, an oil windage tray 17 and a second rib 18.

The oil baffle 4 also has further functions in addition to a sealing function. The ribs 15 and 18 of the oil baffle form the counter bearing for the turbine-side inner race part 7b when pressure is applied to the shaft. The geometry of the introduced cooling oil duct 14 defines the spray direction and the quantity of cooling oil for the shaft shoulder and is configured in such a manner that the cooling oil is sprayed onto the shaft in the direction of rotation of the shaft. An annular chamber between the rolling bearing cartridge 3, the shaft and the oil baffle 4 is configured here in such a manner that the oil mist is held back before the next sealing point of the exhaust turbocharger.

The ribs 15 and 18 are designed in such a manner that they obstruct the sealing function of the sealing disk as little as possible and nevertheless ensure sufficient stability of the entire bearing assembly module for easy disassembly. The tangential rib beginning of the lower rib 18 in FIG. 5 serves as an oil windage tray 17.

The drainage channel 13 which has already been mentioned is formed by the outer diameter of the oil baffle 4 being enlarged in relation to the counter surface of the bearing flange 5.

The greatest sealing function in addition to the drainage channel 13 and the oil windage tray 17 is achieved by a closed annular chamber between the rolling bearing, the oil baffle and the shaft. A wall drawn to a deep point in the direction of the shaft prevents an arising oil mist from spreading out as far as the next sealing point of the exhaust turbocharger. The sealing gap is between 1% and 6% of the diameter of the shaft.

The oil baffle 4 is fastened to the bearing flange 5 using fastening means which keep the required construction space small. In the exemplary embodiment shown, a total of five countersunk-head screws are used for said fastening. Said countersunk-head screws permit easily handleable centering of the oil baffle 4 by uniform screw tightening and therefore by setting as small a sealing gap as possible between the oil baffle 4 and the shaft of the exhaust turbocharger.

As has already been explained above, the quantity of cooling oil can be set in a desired manner by means of suitable geometry of the cooling oil duct 14. Since said functional geometry is not located in the bearing flange 5, but rather in the simply configured and more cost-effective oil baffle 4, the oil baffle 4 can be modified, depending on the respective application, for adaptation to the cooling requirements present in each case. The cooling oil duct is designed here in such a manner that, during the operation of the bearing assembly module, the cooling oil is sprayed onto the shaft in the direction of rotation of the shaft. The outermost spray oil region impinges tangentially onto the shaft, and therefore the occurrence of an oil blockage in the annular duct is reduced by the described specification of direction and the oil tightness is ensured.

A further turbine-side improvement of the oil sealing within the bearing assembly module is achieved by an encircling thin wall. The latter prevents oil of the squeeze oil damper of the rolling bearing from being able to spray away in an uncontrolled manner at the location where the oil baffle 4 is open for the purpose of better oil drainage. Furthermore, this wall separates the oil volumetric flow of the squeeze oil damper from the cooling oil flow. This permits a more precise setting of a respectively required amount of cooling oil. The oil of the turbine-side squeeze oil damper also flows off through the wall in the controlled manner only at one point, to the lower opening.

Figure 6:
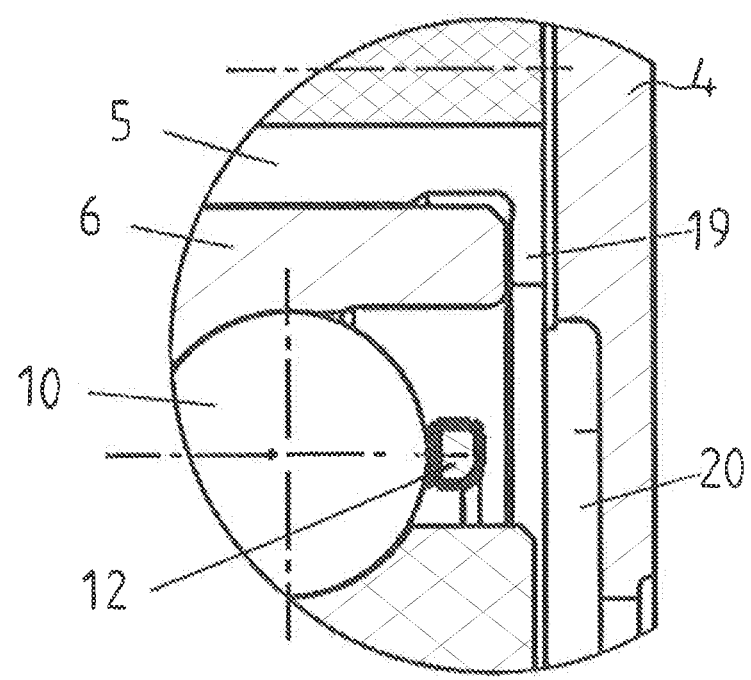
FIG. 6 shows a sectional illustration of a further part of the rolling bearing cartridge.

FIG. 6 shows a sectional illustration of a further small region of the bearing assembly module 1. In said FIG. 6, parts of the oil baffle 4, of the bearing flange 5, of the outer race 6, of the ball 10 and of the cage 12 are illustrated. The bearing flange 5 has an encircling wall 19 which is formed inward in the radial direction and is designed for separating the cooling oil flow from the oil of the squeeze oil damper. Said encircling wall 19 furthermore has a sealing function which prevents oil from spraying away axially from the squeeze oil damper in the direction of the oil baffle 4. Furthermore, an annular chamber 20 is illustrated in FIG. 6. Said annular chamber is formed between the rolling bearing, the encircling wall and the shaft of the exhaust turbocharger.

The encircling wall 19 shown leads from a rotor-dynamic aspect to a laterally closed squeeze oil damper. One advantage of this is a smaller cavitation tendency of the oil edge zone, as a result of which, in turn, more stable damping is achieved. Said more stable damping increases the service life of the bearing assembly module and thus of the entire exhaust turbocharger.

Figure 7:
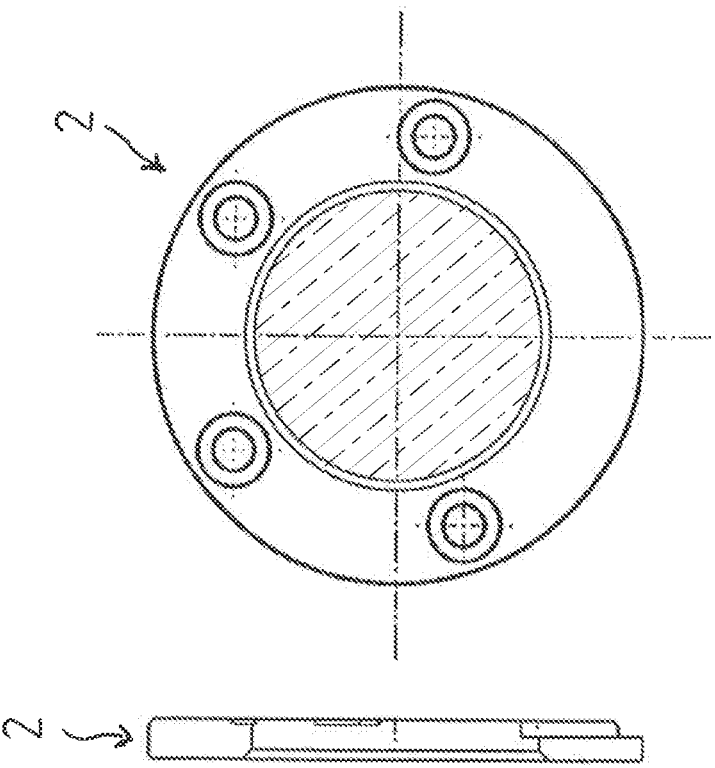
FIG. 7 shows illustrations for illustrating a closure cover.
Figure 7:
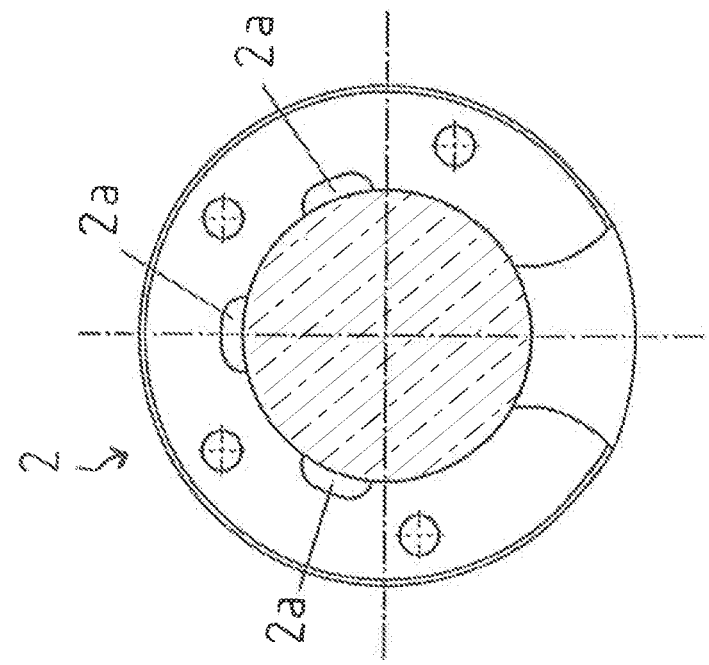

FIG. 7 illustrates the closure cover 2 which has already been mentioned above and which is arranged on the compressor side of the bearing assembly module. Said closure cover is preferably produced from nonferrous metal and forms an axial stop for absorbing a shaft shearing load acting in the direction of the compressor. The choice of nonferrous metal as the material for the closure cover 2 promotes the friction behavior between the closure cover 2 and the rolling bearing cartridge 3. Since, during the operation of the exhaust turbocharger, the shearing force causes a friction force on the end side of the rolling bearing cartridge, optimization of the friction makes it possible to reduce the influence on the damping behavior of the squeeze oil damper since the rolling bearing cartridge can move more freely. This also increases the service life of the bearing assembly module 1 and therefore the service life of the entire exhaust turbocharger.

Since—as described—the rolling bearing cartridge 3 is generally present at the closure cover 2 on the compressor side of the bearing assembly module 1 because of the direction of thrust of the rotor of the exhaust turbocharger, the oil on the turbine side of the bearing assembly module 1 can flow off somewhat more easily between the rolling bearing cartridge 3 and the thin encircling wall 19. In order to take into account the fact that different flow speeds of the oil of the compressor-side and turbine-side squeeze oil damper lead to different damping properties, recesses 2a are provided on the closure cover 2, which standardize the oil flow and therefore the oil speed again. This in turn also increases the service life of the bearing assembly module 1 and therefore the service life of the entire exhaust turbocharger. Said recesses 2a in the closure cover 2 are dimensioned in such a manner that the narrowest cross sections thereof are in total between 5% and 30% larger than the drainage surface on the opposite side, wherein the oil outflow at the lower point is identical on the compressor side and turbine side and is excluded in the calculation mentioned. This increase is provided as compensation for the more difficult flow conditions on the compressor side of the bearing assembly module 1.

It is apparent from FIG. 7 that the closure cover 2 has three such recesses 2a in the exemplary embodiment shown.

Figure 8:
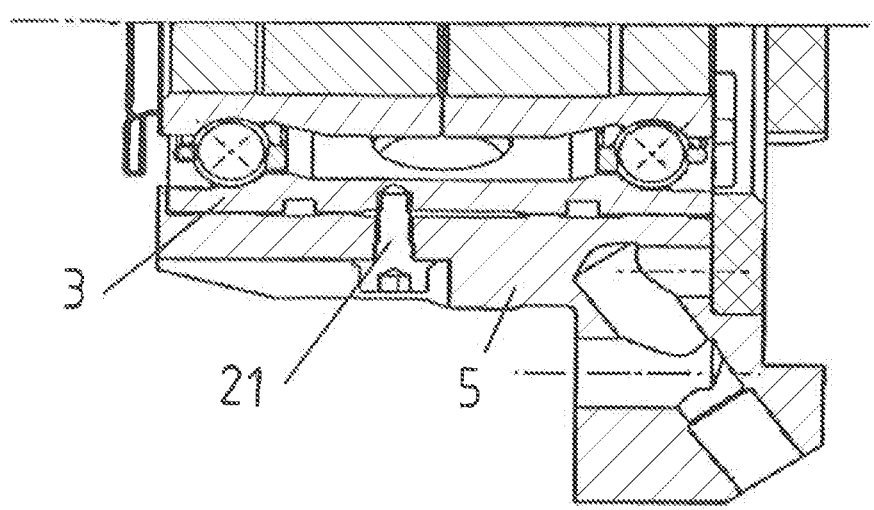
FIG. 8 shows a sectional illustration for illustrating an implementation of a rotation prevention means.

FIG. 8 shows a sectional illustration for illustrating an implementation of a rotation prevention means. For said rotation prevention means, a rotation prevention screw 21 is guided through the bearing flange 5 and into the rolling bearing cartridge 3.

An exhaust turbocharger shaft mounted by rolling bearings can be slightly modified in relation to a shaft mounted by plain bearings or else can be the same shaft.

Within the scope of the functionally necessary adaptations, features are provided which increase the service life of the rolling bearing.

The smaller contact region in particular on the turbine side between the shaft and the bearing race brings about a reduced heat input from the shaft into the bearing race. Since the bearing service life depends directly on the bearing temperature, said reduced heat input from the shaft into the bearing race brings about an increase in the service life of the bearing assembly module and therefore of the entire exhaust turbocharger.

The small diameter of the inner race stop leads to a greater area on the inner race that comes into contact with cooling oil. This likewise results in a temperature reduction. Said temperature reduction also leads to an increase in the service life of the bearing assembly module and therefore of the entire exhaust turbocharger.

The list below summarizes advantageous properties of at least some embodiments of the invention.

Advantageous properties with regard to the service life:
application-variable shaft and bearing cooling by use of a separate cooling oil duct,
possibility of disassembly without destroying the bearing,
improvement in the rotor dynamics by standardizing the damping properties on both sides of the bearing assembly module by means of oil drainage ducts and a friction optimized pairing of materials,
reduction of the contact area between the shaft and the bearing races for the purpose of lower heat input.

Advantageous properties with regard to the complexity:
interchangeability of a rolling bearing variant with a plain bearing variant by use of a modular bearing flange concept,
retrofitting capability by using identical parts,
use of a common oil circuit for engine and exhaust turbocharger,
dismantlability without destroying the bearing,
centering the sealing disk by means of countersunk-head screws,
dispensing with axial bearing stabilization in the squeeze oil damper by means of friction optimization.

Advantageous properties with regard to the oil tightness:
use of an oil windage tray,
use of a drainage channel,
thin wall inward into the vicinity of the shaft against oil mist,
thin wall for delimiting the squeeze oil damper,
outflow-optimized supporting ribs for simplified disassembly, spraying direction of the cooling oil in direction of rotation of the shaft.

A bearing assembly module with a rolling bearing, as has been described above, can be inserted or is inserted in the bearing housing of the bearing of an exhaust turbocharger, as has already been illustrated above with reference to FIG. 1. Said bearing housing advantageously has an interface for the bearing assembly module, said interface being designed for making contact with the bearing flange of the bearing assembly module. When required, the bearing assembly module can be removed from the exhaust turbocharger advantageously without being destroyed and can also itself be dismantled without being destroyed, in order to be able to replace individual components. For example, the bearing assembly module according to the invention having rolling bearings can be removed from said bearing housing and replaced by a bearing assembly module having plain bearings. Said bearing assembly module having plain bearings and the bearing assembly module having rolling bearings correspond with regard to the design and the external dimensions to an extent such that the bearing assembly module having rolling bearings and the bearing assembly module having plain bearings can be inserted interchangeable into the receiving chamber of the bearing housing of the bearing. The bearing assembly module having plain bearings also has a bearing flange which can make contact with the interface of the bearing housing of the exhaust turbocharger. Said interface—as has already been explained above—is advantageously designed for connecting an oil duct guided through the bearing housing to one or more oil ducts guided through the bearing flange of the bearing assembly module.

LIST OF REFERENCE SIGNS

1 Bearing assembly module
2 Closure cover
3 Rolling bearing cartridge
4 Oil baffle
5 Bearing flange
6 Outer race
6a Rim
7 Inner race
7a First inner race part
7b Second inner race part
8 Ball
9 Ball
10 Ball
11 Ball
12 Cage
13 Drainage channel
14 Cooling oil duct
15 First rib
16 Seal wall
17 Oil windage tray
18 Second rib
19 Wall
20 Annular chamber
21 Rotation prevention screw
22 Exhaust turbocharger
23 Compressor
24 Compressor wheel
25 Turbine
26 Turbine wheel
27 Shaft
28 Bearing
29 Bearing housing
29a Oil duct guided through the bearing housing
30 Receiving chamber
30a Interface of the receiving chamber
30b Compressor-side region of the receiving chamber 30
30c Turbine-side region of the receiving chamber 30
31 Step
32 Fastening means
33 Axis of rotation of the exhaust turbocharger
34 Axial direction
35 Radial direction
36 Bore in the bearing assembly module
37 Gap
X Distance
Y Extension
Z Distance

The invention claimed is:

1. An exhaust turbocharger comprising:
a modular bearing which is arranged between a compressor and a turbine and is designed for bearing a shaft, wherein the modular bearing includes a bearing assembly module having a rolling bearing or a bearing assembly module having a plain bearing,
wherein the modular bearing is inserted in a bearing housing with a receiving chamber dimensioned such that the bearing assembly module having the rolling bearing and the bearing assembly module having the plain bearing can be installed in the receiving chamber interchangeably, and can be removed from the receiving chamber without being destroyed, wherein each bearing assembly module defines one or more ducts on a compressor side of the bearing assembly module,
wherein the receiving chamber has an interface which is designed for making contact with a bearing flange of either bearing assembly module installed in the receiving chamber and for connecting an oil duct guided through the bearing housing to the one or more oil ducts which are guided through the bearing flange,
wherein the receiving chamber further has a step including a stop surface running substantially in a radial direction of the exhaust turbocharger, wherein the stop surface faces the compressor and defines an axial stop for the bearing assembly module installed on the compressor side, wherein the step divides the receiving chamber into (i) a first receiving chamber section arranged on the compressor side and (ii) a second receiving chamber section arranged on a turbine side, wherein the first receiving chamber section is larger in the radial direction than the second receiving chamber section, wherein the first and second receiving chamber sections are arranged axially adjacent to one another, wherein the step is arranged between the first and second receiving chamber sections, wherein the one or more oil ducts are connected to the duct defined in the bearing housing, and wherein the one or more ducts defined in the installed bearing assembly module are positioned within the first receiving chamber section of the exhaust turbocharger.

2. The exhaust turbocharger of claim 1, wherein the bearing assembly module having the rolling bearing comprises a rolling bearing cartridge comprising the bearing flange, a closure cover, an oil baffle, and a rotation prevention means, and wherein the rolling bearing cartridge comprises an outer race, an inner race and rolling bodies arranged between the outer race and the inner race.

3. The exhaust turbocharger of claim 2, wherein the inner race has a first inner race part and a second inner race part, and wherein a turbine-side outer edge of the second inner race part is extended outward in an axial direction relative to a turbine-side outer edge of the outer race.

4. The exhaust turbocharger of claim 2, wherein the oil baffle serves as an axial counter bearing for the inner race, and wherein, at zero load, an axial gap between the inner race and the oil baffle is smaller than an axial movability of turbine-side rolling bodies of the rolling bearing in the rolling bearing cartridge.

5. The exhaust turbocharger of claim 2, wherein the oil baffle has two ribs, and wherein an edge of one of the two ribs serves as an oil windage tray for introduced cooling oil during operation of the bearing assembly module.

6. The exhaust turbocharger of claim 2, wherein a drainage channel is formed within the oil baffle, and wherein a diameter of the oil baffle is larger at a radially outer edge thereof relative to a counter surface of the bearing flange adjacent to the radially outer edge.

7. The exhaust turbocharger of claim 2, wherein the oil baffle is fastened to the bearing flange by fastening elements and can be centered on the bearing flange by the fastening elements.

8. The exhaust turbocharger of claim 2, wherein the closure cover is designed to serve as an axial stop for absorbing a shearing load acting in an axial direction toward the compressor.

9. The exhaust turbocharger of claim 2, wherein the closure cover is composed of nonferrous metal.

10. The exhaust turbocharger of claim 1, wherein the interface is provided at the stop surface.

11. The exhaust turbocharger of claim 1, wherein the step is arranged in a central part of an axial extent of the receiving chamber.

12. The exhaust turbocharger of claim 1, wherein a gap exists between a turbine-side end of the bearing assembly module and a turbine-side end of the bearing housing during operation of the exhaust turbocharger.

13. The exhaust turbocharger of claim 2, wherein the closure cover has recesses.

14. A set of bearing assembly modules each for bearing a shaft of an exhaust turbocharger, the set of bearing assembly modules comprising:
  a bearing assembly module having a rolling bearing, and
  a bearing assembly module having a plain bearing,
  wherein each bearing assembly module includes a first portion and a second portion, wherein the first portion is larger than the second portion in a radial direction, wherein each bearing assembly module defines a duct in the first portion, and wherein both bearing assembly modules of the set of bearing assembly modules can be installed in a receiving chamber of the exhaust turbocharger interchangeably to bear the shaft of the exhaust turbocharger and can be removed from the receiving chamber without being destroyed.

15. The set of bearing assembly modules of claim 14, wherein the bearing assembly module having the rolling bearing and the bearing assembly module having the plain bearing each have external dimensions that allow the bearing assembly modules to be inserted interchangeably into the receiving chamber.

16. A method for bearing a shaft of an exhaust turbocharger comprising a modular bearing that includes a bearing assembly module arranged between a compressor and a turbine of the exhaust turbocharger, wherein the modular bearing is inserted in a bearing housing with a receiving chamber, wherein the receiving chamber has a step including a stop surface running substantially in a radial direction of the exhaust turbocharger, wherein the stop surface faces the compressor and defines an axial stop for the bearing assembly module installed on a compressor side, and wherein the step divides the receiving chamber into (i) a first receiving chamber section arranged on the compressor side and (ii) a second receiving chamber section arranged on a turbine side, the method comprising:
  selecting the bearing assembly module from a set of bearing assembly modules comprising a bearing assembly module having a rolling bearing and a bearing assembly module having a plain bearing, wherein both bearing assembly modules of the set of bearing assembly modules can be installed in the receiving chamber interchangeably, and can be removed from the receiving chamber without being destroyed, wherein each bearing assembly module defines one or more ducts on the compressor side of the bearing assembly module, and wherein the receiving chamber has an interface which is designed for making contact with a bearing flange of either bearing assembly module installed in the receiving chamber and for connecting an oil duct guided through the bearing housing to the one or more oil ducts which are guided through the bearing flange and
  installing the selected bearing assembly module in the receiving chamber, wherein the first receiving chamber section receives an additional thrust bearing when the selected bearing assembly module is the bearing assembly module having the plain bearing, wherein the one or more oil ducts are connected to the duct defined in the bearing housing, and wherein the one or more ducts defined in the installed bearing assembly module are positioned within the first receiving chamber section of the exhaust turbocharger.

17. The method of claim 16, further comprising:
  removing, without destruction, the bearing assembly module installed in the receiving chamber,
  selecting another bearing assembly module from the set of bearing assembly modules, and
  installing the selected another bearing assembly module in the receiving chamber.

\* \* \* \* \*